United States Patent
Liu et al.

(10) Patent No.: US 7,304,780 B2
(45) Date of Patent: Dec. 4, 2007

(54) BACKPLANE DESIGN FOR DISPLAY PANELS AND PROCESSES FOR THEIR MANUFACTURE

(75) Inventors: John Hanan Liu, Sunnyvale, CA (US); Gary Y. M. Kang, Fremont, CA (US); Yi-Shung Chaug, Cupertino, CA (US)

(73) Assignee: SiPix Imaging, Inc., Fremont, CA (US)

(*) Notice: Subject to any disclaimer, the term of this patent is extended or adjusted under 35 U.S.C. 154(b) by 0 days.

(21) Appl. No.: 11/281,208

(22) Filed: Nov. 15, 2005

(65) Prior Publication Data

US 2006/0132428 A1    Jun. 22, 2006

Related U.S. Application Data

(60) Provisional application No. 60/637,194, filed on Dec. 17, 2004.

(51) Int. Cl.
  *G02F 1/03*   (2006.01)
  *G02F 1/1333*   (2006.01)
  *G02F 1/1339*   (2006.01)
  *G02B 26/00*   (2006.01)
  *G09G 3/34*   (2006.01)
  *G09G 3/12*   (2006.01)

(52) U.S. Cl. ............... 359/245; 359/296; 345/36; 345/47; 345/107; 349/86; 349/92; 349/138; 349/149; 349/153; 349/155; 349/156; 313/497; 313/507

(58) Field of Classification Search ........... 359/240, 359/243, 245, 253, 296, 452; 345/36, 47, 345/85, 104, 105, 107, 108, 111, 175; 349/12, 349/38, 86, 92, 149, 153, 155, 156, 93; 313/495, 313/497, 518, 519, 583, 507, 510; 40/446, 40/544; 430/19, 35, 38, 65, 319, 322; 252/572
See application file for complete search history.

(56) References Cited

U.S. PATENT DOCUMENTS 3,504,214 A * 3/1970 Cox et al. ............. 313/507

(Continued)

OTHER PUBLICATIONS

Allen, K. (Oct. 2003). Electrophoretics Fulfilled. *Emerging Displays Review: Emerging Display Technologies, Monthly Report*—Oct. 9-14, 2003.

(Continued)

*Primary Examiner*—Loha Ben
(74) *Attorney, Agent, or Firm*—Howrey LLP

(57) ABSTRACT

The present invention relates to a backplane design for display panels and processes for their manufacture. The invention provides cost-effective ways to manufacture a display panel because the manufacture does not involve the use of a patterned ITO substrate, flexible printed circuit board or rigid circuit board. In addition, a roll-to-roll process can be employed to manufacture the display panel.

17 Claims, 8 Drawing Sheets

U.S. PATENT DOCUMENTS

| | | | | |
|---|---|---|---|---|
| 3,966,302 | A | * | 6/1976 | Mikoda et al. ............. 349/138 |
| 4,401,982 | A | * | 8/1983 | Miyazaki et al. ............. 345/47 |
| 5,206,748 | A | * | 4/1993 | Yamazaki .................... 349/73 |
| 5,754,332 | A | | 5/1998 | Crowley ..................... 359/296 |
| 5,930,026 | A | | 7/1999 | Jacobson et al. ........... 359/296 |
| 5,961,804 | A | | 10/1999 | Jacobson et al. ........... 204/606 |
| 6,072,559 | A | * | 6/2000 | Kanemori et al. .......... 349/192 |
| 6,177,968 | B1 | * | 1/2001 | Okada et al. ................. 349/38 |
| 6,232,950 | B1 | | 5/2001 | Albert et al. ............... 345/107 |
| 6,236,446 | B1 | * | 5/2001 | Izumi et al. ................ 349/187 |
| 6,466,294 | B1 | * | 10/2002 | Yamagishi et al. ......... 349/155 |
| 6,497,942 | B2 | | 12/2002 | Sheridon et al. ......... 428/195.1 |
| 6,588,131 | B2 | | 7/2003 | O'Connell, Jr. .............. 40/446 |
| 6,672,921 | B1 | | 1/2004 | Liang et al. .................. 445/24 |
| 6,690,444 | B1 | * | 2/2004 | Wilkinson et al. .......... 349/153 |
| 6,784,953 | B2 | | 8/2004 | Liang et al. .................. 349/86 |
| 6,795,138 | B2 | | 9/2004 | Liang et al. .................. 349/92 |
| 6,930,818 | B1 | | 8/2005 | Liang et al. ................ 359/296 |
| 6,933,098 | B2 | | 8/2005 | Chan-Park et al. ......... 430/311 |
| 6,982,178 | B2 | | 1/2006 | LeCain et al. ................ 438/22 |
| 2003/0203101 | A1 | | 10/2003 | Chaug et al. .............. 427/96.9 |
| 2004/0131779 | A1 | | 7/2004 | Haubrich et al. ........... 427/261 |
| 2004/0182711 | A1 | | 9/2004 | Liang et al. ................ 204/606 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcup® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process* . Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Mossman, M.A. et al, (2000) New Reflective Display Based on Total Internal Reflection in Prismatic Microstructure. *SID IDRC Proceeding*, pp. 311-314.

Mossman, M.A. et al, (2001) New Reflective Color Display Technique Based on Total Internal Reflection and Subtractive Color Filtering. *SID 2001 Digest*, pp. 1054-1057.

Mossman, M.A. et al, (2002) Grey Scale Control of TIR Using Electrophoresis of Sub-Optical Pigment Particles. *SID 2002 Digest*, pp. 522-525.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

\* cited by examiner 2b-2

2b-1

2b-4

2b-3

BACKPLANE DESIGN FOR DISPLAY PANELS AND PROCESSES FOR THEIR MANUFACTURE

This application claims the priorities under 35 USC 119(e) of U.S. Provisional Application No. 60/637,194, filed on Dec. 17, 2004. The whole content of the priority application is incorporated herein by reference in its entirety.

FIELD OF THE INVENTION

The present invention relates to a backplane design for display panels and processes for manufacturing such display panels.

BACKGROUND OF THE INVENTION

An electrophoretic display (EPD) is a non-emissive device based on the electrophoresis phenomenon influencing the migration of charged pigment particles in a solvent, preferably a colored dielectric solvent. This type of display was first proposed in 1969. An EPD typically comprises a pair of opposed, spaced-apart plate-like electrodes, with spacers predetermining a certain distance between them. At least one of the electrodes, typically on the viewing side, is transparent. For the passive type of EPDs, row and column electrodes on the top (the viewing side) and bottom plates, respectively, are needed to drive the displays. In contrast, an array of thin film transistors (TFTs) on the bottom plate and a common, non-patterned transparent conductor plate on the top viewing substrate may be used for the active type EPDs.

An electrophoretic dispersion composed of a dielectric solvent and charged pigment particles dispersed therein is enclosed between the two plates. When a voltage difference is imposed between the two electrodes, the charged pigment particles migrate by attraction to the plate of polarity opposite that of the pigment particles. Thus, the color showing at the transparent plate, determined by selectively charging the plates, may be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD [M. A. Hopper and V. Novotny, IEEE Trans. Electr. Dev., Vol. E D 26, No. 8, pp. 1148-1152 (1979)], the microencapsulated EPD (U.S. Pat. Nos. 5,961,804 and 5,930,026 and U.S. applications, Ser. No. 60/443,893, filed Jan. 30, 2003 and Ser. No. 10/766,757, filed on Jan. 27, 2004) and the total internal reflection (TIR) type of EPD using microprisms or microgrooves as disclosed in M. A. Mossman, et al, SID 01 Digest pp. 1054 (2001); SID IDRC proceedings, pp. 311 (2000); and SID'02 Digest, pp. 522 (2002).

An improved EPD technology was disclosed in U.S. Pat. No. 6,930,818 filed on Mar. 3, 2000 (corresponding to WO01/67170), U.S. Pat. No. 6,672,921 filed on Jun. 28, 2000 (corresponding to WO02/01281) and U.S. Pat. No. 6,933,098 filed on Feb. 15, 2001 (corresponding to WO02/65215). The improved EPD comprises isolated cells formed from microcups and filled with charged pigment particles dispersed in a dielectric solvent. To confine and isolate the electrophoretic dispersion in the cells, the filled cells are top-sealed with a polymeric sealing layer, preferably formed from a composition comprising a material selected from the group consisting of thermoplastics, thermoplastic elastomers, thermosets and precursors thereof.

A liquid crystal display comprising display cells prepared by the microcup technology and filled with a liquid crystal composition optionally comprising a dichroic dye is disclosed in U.S. Pat. Nos. 6,795,138 and 6,784,953.

A display panel may also be prepared by the Gyricon technology (as disclosed in U.S. Pat. No. 6,588,131 assigned to Gyricon Media, Inc. and U.S. Pat. Nos. 6,497,942, and 5,754,332 assigned to Xerox). A Gyricon sheet is a thin layer of transparent plastic in which millions of small beads, somewhat like toner particles, are randomly dispersed. The beads, each contained in an oil-filled cavity, are free to rotate within those cavities. The beads are "bichromal" with hemispheres of two contrasting colors (e.g., black and white, red and white), and charged so they exhibit an electrical dipole. When a voltage is applied to the surface of the sheet, the beads rotate to present one colored side to the viewer. Voltages can be applied to the surface to create images such as text and pictures. The image will persist until new voltage patterns are applied.

For a direct drive display, a display cell layer (10) typically is sandwiched between a common electrode layer (11) and a backplane (12) as shown in FIG. 1.

The common electrode layer (11) is a single electrode layer which covers the entire display area. The backplane (12) comprises a substrate layer on which a desired graphic pattern (13) is printed or coated with a conductive material. In an electrophoretic display, the charged pigment particles in the display cell layer in the area of the desired graphic pattern may migrate to either the side of the common electrode layer or the side of the backplane, depending on the voltage difference between the common electrode layer and the conductive pattern.

The desired graphic pattern may be alphabet letters, numerical displays (such as those utilizing the well-known 7 or 14 segment electrodes), logos, signs or other graphic designs.

The backplane is usually formed of a patterned ITO substrate, a flexible printed circuit board or a rigid circuit board. However, these types of the backplane are not only expensive but also relatively complex in manufacture.

SUMMARY OF THE PRESENT INVENTION

The present invention is directed to a backplane design for a display panel, in particular, a direct drive display panel.

The first aspect of the present invention is directed to a backplane design.

The second aspect of the present invention is directed to a display panel having the present backplane design.

The third aspect of the invention is directed to various processes for the manufacture of a display panel having the present backplane design.

The present invention provides cost-effective ways to manufacture a display panel because the manufacture does not involve the use of a patterned ITO substrate, flexible printed circuit board or rigid circuit board. In addition, a roll-to-roll process can be employed to manufacture the display panel of the present invention.

It is noted that the whole content of each document referred to in this application is incorporated by reference into this application in its entirety.

DETAILED DESCRIPTION OF THE PRESENT INVENTION

Figure 2:
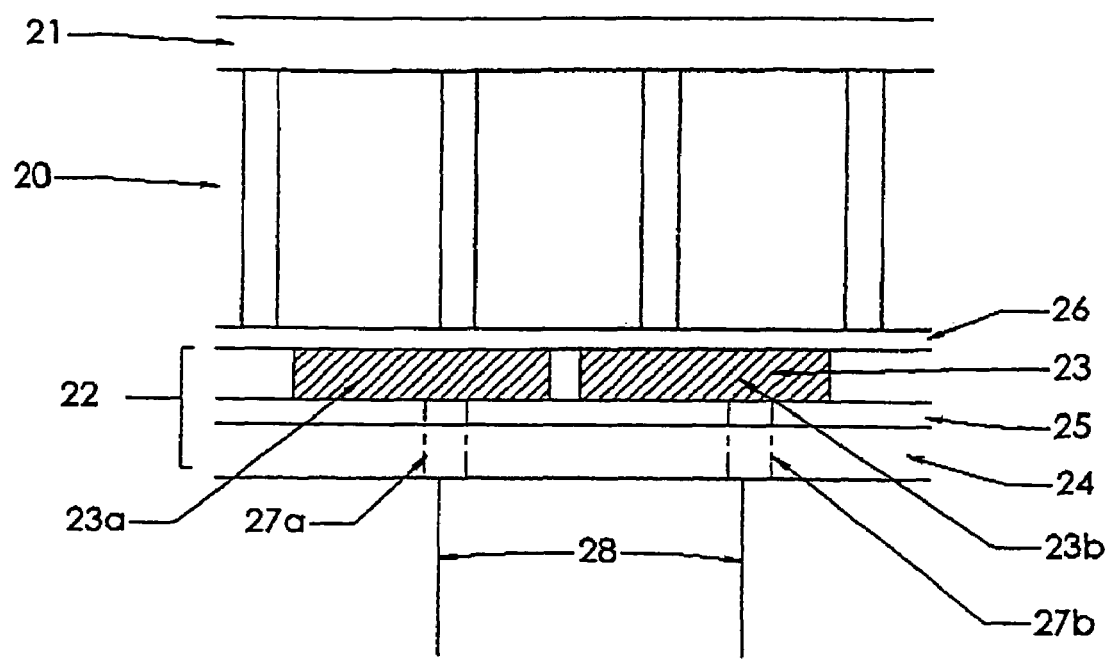
FIG. 2 illustrates a display panel having the present backplane design.

FIG. 2 is a cross-section view of a display panel having a backplane design of the present invention. As shown in this figure, an array of display cells (20) is sandwiched between a top common electrode layer (21) and a backplane (22).

The backplane (22) comprises a patterned conductive layer (23) and a non-conductive layer (24). There may also be an adhesive layer (25) between the patterned conductive layer (23) and the non-conductive layer (24).

The backplane (22) is laminated to the array of display cells (20), preferably with an adhesive layer (26). However, depending on the size of the pattern, the adhesive layer (26) may not be necessary. In other words, if the area not covered by the conductive material (23) is of a reasonable size, the adhesive layer (25) may be sufficient to hold both the patterned conductive layer (23) and the non-conductive layer (24) to the display cell layer (20).

Alternatively, the backplane (22), i.e., the patterned conductive layer (23) and the non-conductive layer (24), may also be formed by, for example, printing or coating, directly on the array of display cells (20). In this case, the adhesive layers (25) and (26) may not be necessary.

There are through holes (27a and 27b) on the non-conductive layer (24) and the adhesive layer (25), if present, to allow connection of the patterned conductive layer (23) to the driving components, such as driver and/or control elements. The purpose of through holes (27) is to provide open areas for the conducting lines (28) to pass through. The through holes (27), in this case, can be easily formed by cutting, punching or drilling. Unlike the via holes widely used in the manufacture of printed circuit boards or rigid circuit boards, the formation of the through holes in this case does not involve any complex metallization process which usually involves the steps of etching, activation, metallization and electroplating.

The conductive lines (28) connecting the patterned conductive layer (23) to the driving components may be strips of metal or metal oxide with a conductive adhesive on the backside. For higher resolution applications, the conductive lines (28) may also be laid down by inkjet or screen printing of a conductive material.

The conductive layer (23) may have separate conductive pieces (e.g., 23a and 23b) depending on the pattern. For example, for a 7-segment alphanumberical pattern, there would be at least 7 separate conductive pieces on the conductive layer (23).

The conductive layer (23) is usually formed of a conductive material which may be a metal (e.g., aluminum, copper, zinc, tin, molybdenum, nickel, chromium, silver, gold, iron, indium, thallium, titanium, tantalum, tungsten, rhodium, palladium, platinum, cobalt or the like), metal oxide, alloy or a multilayer composite derived from the aforementioned metal and/or metal oxide, e.g., aluminum zinc oxide, galinium indium oxide, tin oxide or fluorine-doped indium oxide.

The thickness of the printed conductive layer (23) may vary from about 0.01 micron to about 1000 micron; however, it is usually in the range of from about 0.05 micron to about 500 micron, preferably about 0.5 micron to about 300 micron.

Suitable materials for the non-conductive layer (24) may include, but are not limited to, acetates, acrylics, acetal resins, polycarbonates, melamines, neoprene rubbers, polyesters, polyolefins, polystyrenes, polyurethanes, polyvinylchlorides, or thermoplastic materials such as polysulfones, polyetherimides, polyamideimides and polyphenylenes or a plastic material formed from acrylonitrile, butadiene and styrene.

The thickness of the non-conductive layer (24) may be in the range of 0.1 micron to 500 micron, preferably in the range of 0.5 micron to 250 micron.

The display cells (20), in the context of the present invention, may be any known type of the display cells, including those described in the "Background of the Invention" section, such as the partition-type display cells, the display cells prepared by the microcup technology or the microcapsule technololgy, the display cells filled with an electrophoretic fluid or a liquid crystal composition or display cells prepared by the Gyricon technology.

Figure 3:
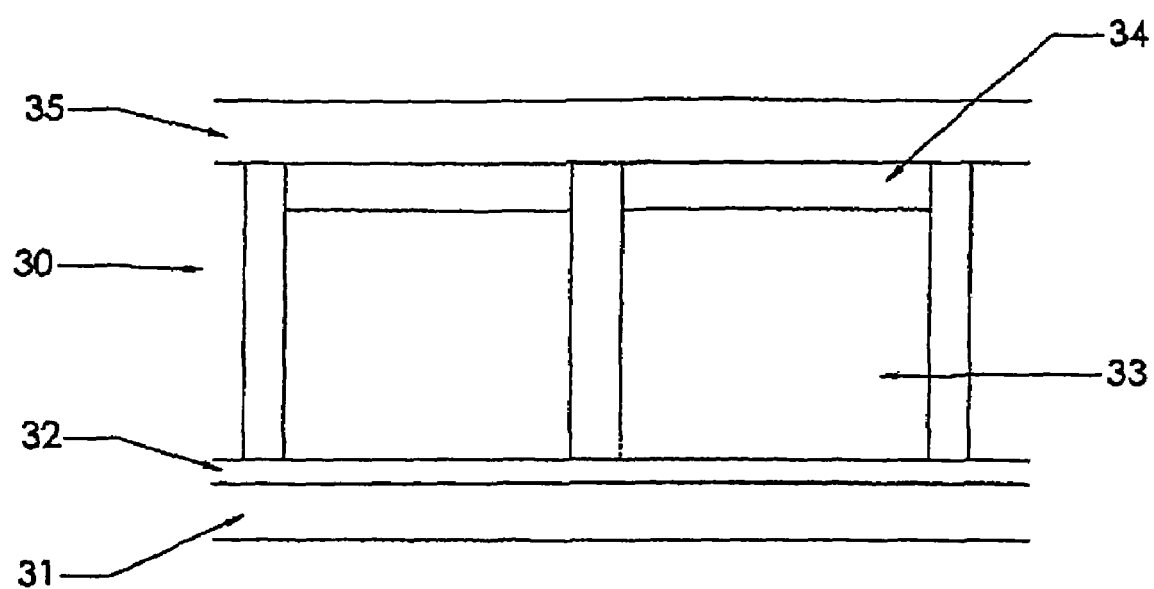
FIG. 3 is a cross-section view of a display cell layer prepared by the microcup technology.

FIG. 3 depicts a typical display cell layer prepared by the microcup technology as disclosed in U.S. Pat. No. 6,930,818. The microcup-based display cells (30) are formed by microembossing or photolithography on an electrode layer (31). A primer layer (32) is optionally present between the display cells and the electrode layer (31). The cells may be filled with an electrophoretic fluid or a liquid crystal composition (33) and sealed with a sealing layer (34). An adhesive layer (35) may be applied onto the filled and sealed microcups.

Figure 2A:
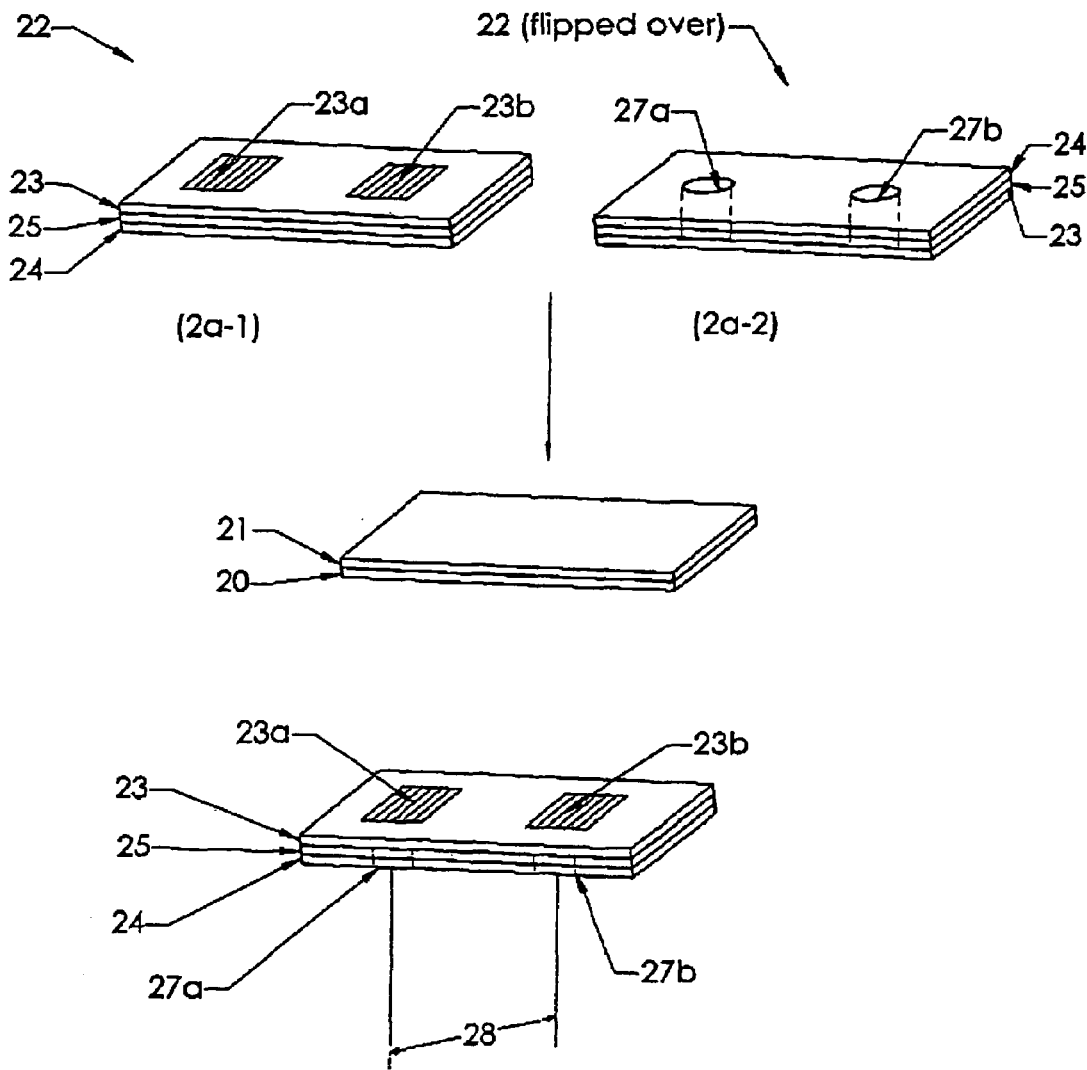
FIGS. 2a and 2b illustrate the manufacture of a display panel having a backplane of the present invention.

In one embodiment of the present invention, the non-conductive layer (24) may be a liner layer adhered to the conductive layer (23). This type of the film having a liner layer adhered to a conductive layer is usually commercially available. FIG. 2a illustrates one of the processes for the manufacture of such a display panel.

The liner layer (24) on which the conductive material is laminated may be formed of an epoxy resin, polyimide, polysulfone, polyarylether, polycarbonate (PC), polyethylene terephthalate (PET), polyethylene terenaphthalate (PEN), poly(cyclic olefin) or composite thereof.

Figure 1:
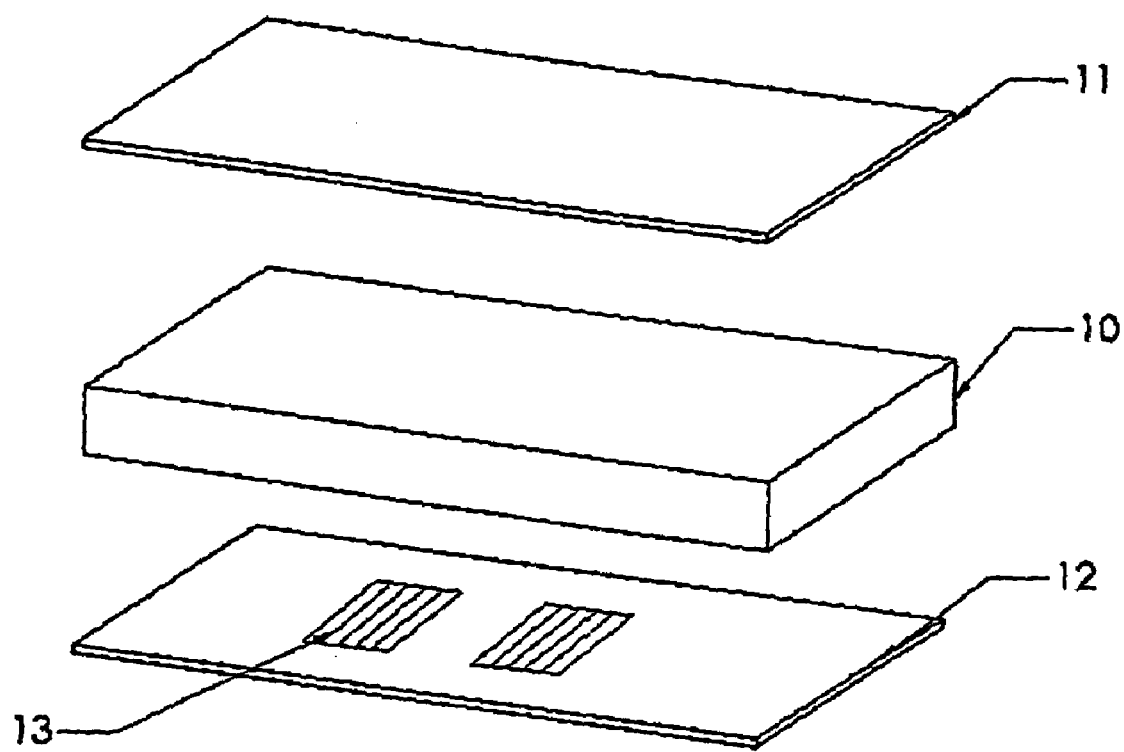
FIG. 1 illustrates general features of a direct drive display.

The pattern on the conductive layer may be formed by a variety of methods (FIG. 2a-1). In one embodiment, the pattern is formed by cutting, such as die cutting, blade cutting or laser cutting. In this case, the "kiss cut" is usually employed. In this type of cutting, a pattern is created on the conductive layer (23); however, the cutting does not extend onto the liner layer (24) already adhered to the conductive layer (23). The cutting creates a pattern having separate conductive pieces (e.g., 23a and 23b).

The through holes (27a and 27b) may also be formed on the liner layer (24) by kiss cutting (FIG. 2a-2) and similarly the cutting to create the through holes on the liner layer does not extend onto the conductive layer (23).

After the pattern and through holes are created, the patterned conductive layer with the liner layer together is laminated onto one side of an array of display cells (20), preferably with an adhesive layer (26). The other side of the array of display cells is the top common electrode layer (21).

Areas on the adhesive layer (25) exposed to the through holes (27a and 27b) may also be removed, before or after lamination of the patterned conductive layer/liner layer to the array of display cells. The removal of the adhesive layer may be carried out by wiping the areas with a suitable solvent, such as methyl ethyl ketone, isopropyl alcohol or acetone.

The conductive lines (28) connecting the patterned conductive pieces to the driving components may be strips of metal or metal oxide with a conductive adhesive on the backside. For higher resolution applications, the conductive lines (28) may also be laid down by inkjet or screen printing of a conductive material.

Figure 2B:
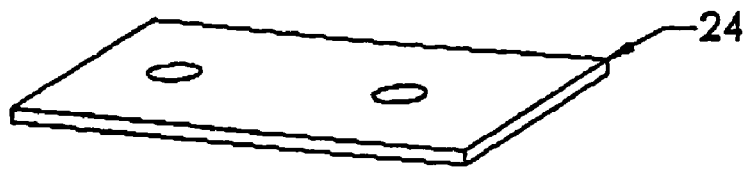
Figure 2B:
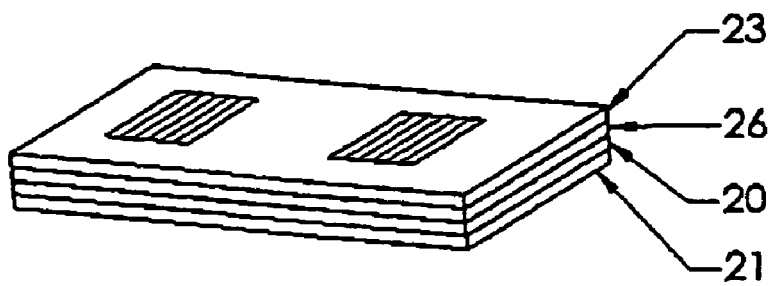
Figure 2B:
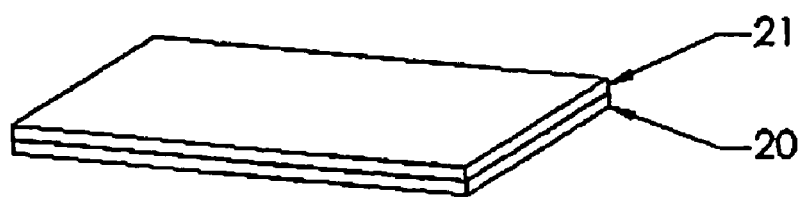
Figure 2B:
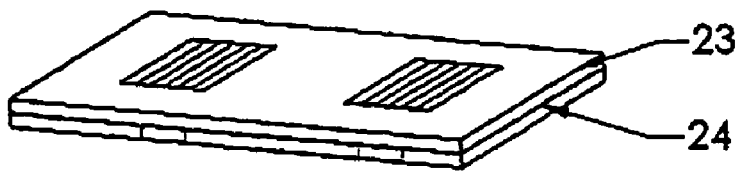

FIG. 2b also illustrates processes for the manufacture of a display panel with a backplane of the present invention.

The patterned conductive layer may be formed using any of the conductive materials described above.

The conductive layer (23) may be printed or coated directly on a non-conductive base layer. Such a layer (not shown in FIG. 2) is on one side of the array of the display cells (20) and is opposite from the side having the top common electrode layer (21). The non-conductive base layer may be formed of a material such as polyethylene terephthalate (PET), polyethylene naphthalate (PEN), polycarbonate, polymethyl methacrylate (PMMA), polysulfone, polystyrene, polyurethane, polysiloxane, epoxy resin, polyolefin, polycycloolefin, polyamide, polyimide, cured vinyl ester, cured unsaturated polyester, cured multifunctional vinyl ether, cured multifunctional acrylate, cured multifunctional allyl or a copolymer thereof. The display cells may be formed on such a non-conductive base layer.

Alternatively, the patterned conductive layer may be printed or coated on an adhesive layer. This alternative is particularly suitable for the microcup-based display panels. In this case, a patterned conductive layer (23) is printed or coated (FIG. 2b-1) on the adhesive layer (26 in FIG. 2 or 35 in FIG. 3) and the non-conductive layer (24) is then laminated, printed or coated over the conductive patterned layer (23) (FIG. 2b-2). In this case, the electrode layer (31 in FIG. 3) is the viewing side. While less preferred, it is also possible to print or coat a conductive pattern on the sealing layer (34).

Further alternatively, the conductive material may be printed on a "temporary" substrate layer that possesses release characteristics. After printing, the conductive-material-printed temporary substrate layer is laminated over the display cell layer (20) with an adhesive layer (26). Due to the release characteristics of the temporary substrate layer, the printed conductive material will be transferred onto the adhesive layer (26) when the temporary substrate layer is peeled off. Any suitable substrate layer with release characteristics, such as non-silicone or silicone release film, may be used as the "temporary" substrate layer for the printing of the conductive material.

In any one of the three methods described above, after the conductive pattern is formed on the non-conductive base layer or the adhesive layer, a non-conductive layer (24) with pre-formed through holes is aligned and laminated over the conductive layer (23). The through holes may be pre-formed by, for example, cutting, punching or drilling. It is also possible to print or coat a non-conductive layer (24) with through holes directly on the conductive-layer-printed side of the display cell layer. In this latter scenario, the adhesive layer (25) would not be necessary.

A further alternative method for the formation of a patterned conductive layer (23) involves printing or coating a conductive material directly on the non-conductive layer (24) with pre-formed through holes (FIG. 2b-3), on the side facing the display cells, and then the printed non-conductive layer (24) is laminated to the display cell layer (20), optionally with an adhesive layer (26) (FIG. 2b-4). In this alternative method, there may be an optional adhesive layer (25) between the conductive pattern layer (23) and the non-conductive layer (24). Such an adhesive layer is not essential for the purpose to promote adhesion between the conductive pattern layer (23) and the non-conductive layer (24) because most of the commercially available printable conductive materials are claimed to have good adhesion properties with a wide variety of substrates. However, as mentioned above, the adhesive layer (25) between the conductive pattern layer (23) and the non-conductive layer (24) may be used to replace the adhesive layer (26).

If the conductive material is printed or coated on the non-conductive layer with pre-formed through holes and fills the through holes, the conductive lines can be strips of metal or metal oxide foil with a conductive adhesive on the backside to allow adhesion between the conductive lines and the conductive layer. Otherwise, screen or inkjet printing of a conductive material after lamination is a better solution for this final step to ensure that the display images on top of the through holes are intact (i.e., can be properly switched).

The printing of the conductive material to create a pattern on the non-conductive base layer, on the adhesive layer (26), on a "temporary" substrate layer or on the non-conductive layer (24), as illustrated above, may be accomplished in a number of ways. For clarity, the non-conductive base layer of a display cell layer (20), the adhesive layer (26), the "temporary" substrate layer or the non-conductive layer (24), will be collectively referred to as the "substrate layer" in the discussion of methods below.

Typically, the formation of a printed conductive layer of a desired pattern on a substrate layer, may be achieved by any of the processes as disclosed in co-pending applications, US Application Publication No. 2003-0203101 (corresponding to WO 03/091788) and U.S. Application Publication No. 2004-0131779, the contents of both applications are incorporated herein by reference in their entirety.

Figure 4A:
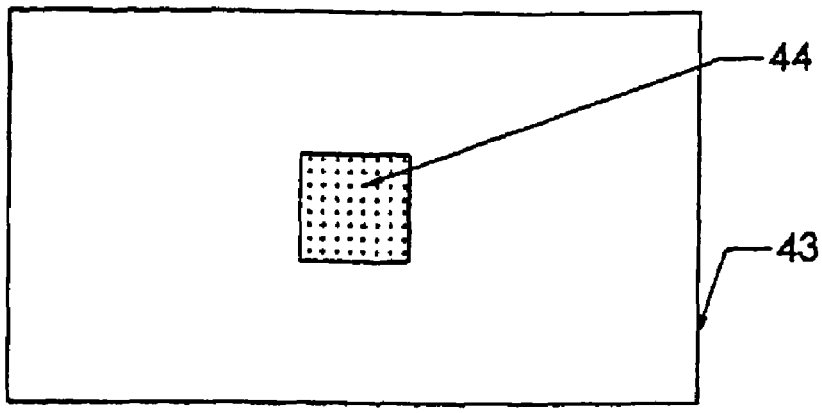
FIGS. 4a-4c illustrate a "positive image printing" process for the formation of a conductive pattern on a substrate layer.
Figure 4B:
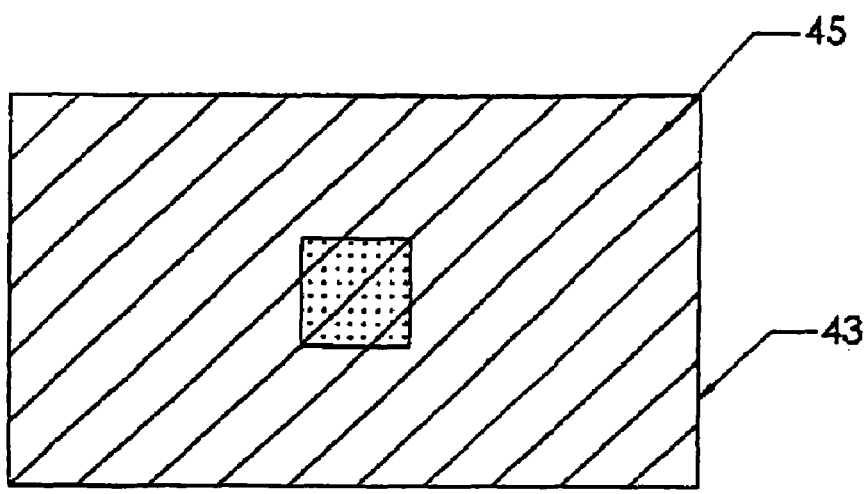
Figure 4C:
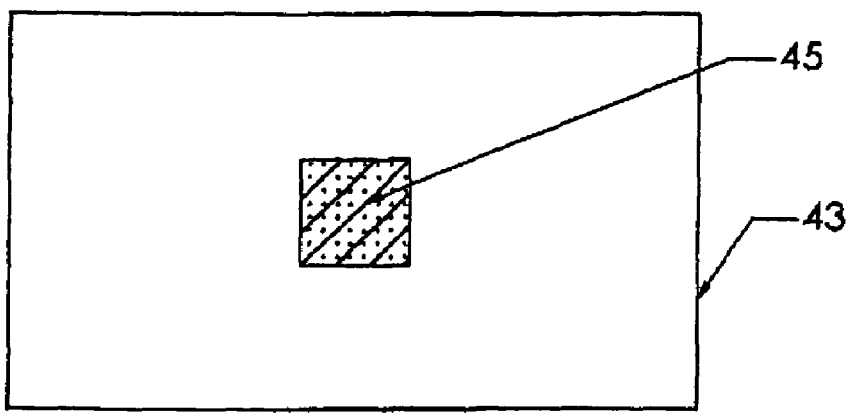

For example, the formation of a printed conductive layer may be carried out by a "positive image printing" process as illustrated in FIGS. 4a-4c. In this process, a "positive image" is created on a substrate layer (43) as shown in FIG. 4a by printing an area corresponding to a desired pattern with a material (44) that is difficult to strip from the substrate layer. Any ink or printable material that has the characteristic that the subsequently deposited conductive film adheres to the ink or printed material more strongly than it adheres to the substrate layer, may be used. In one embodiment, a substrate layer having a poor affinity toward the conductive material may be used. In another embodiment, a surface treatment or primer coating such as a UV curable polymer layer, having good adhesion to both the substrate and the conductive material is used.

The printing may be carried out by any printing techniques, such as flexographic, driographic, electrophotographic or lithographic printing. Other printing techniques, such as stamping, screen printing, gravure printing, ink jet printing or thermal printing may also be suitable.

After formation of the "positive image", a conductive material (45) is deposited on the patterned surface of the substrate layer as shown in FIG. 4b. The deposition of a conductive material may be carried out by any of the methods described below for the "negative image printing" process. However, in the case of the "positive image printing" process, after deposition of the conductive material, the conductive material in the area not covered by the ink or printable material will be removed as shown in FIG. 4c, in a stripping process to reveal the pattern on top of the surface treatment or primer coating.

The stripping may be carried out by using a stripping solvent which may be an aqueous or organic solvent capable of removing the conductive material formed directly on the substrate layer. Alternatively, the stripping may be carried out by mechanical means, e.g., brushing.

Figure 5A:
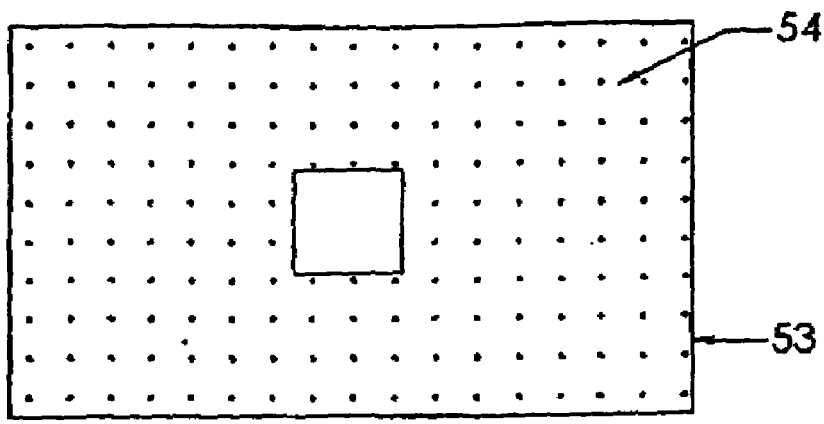
FIGS. 5a-5c illustrate a "negative image printing" process for the formation of a conductive pattern on a substrate layer.
Figure 5B:
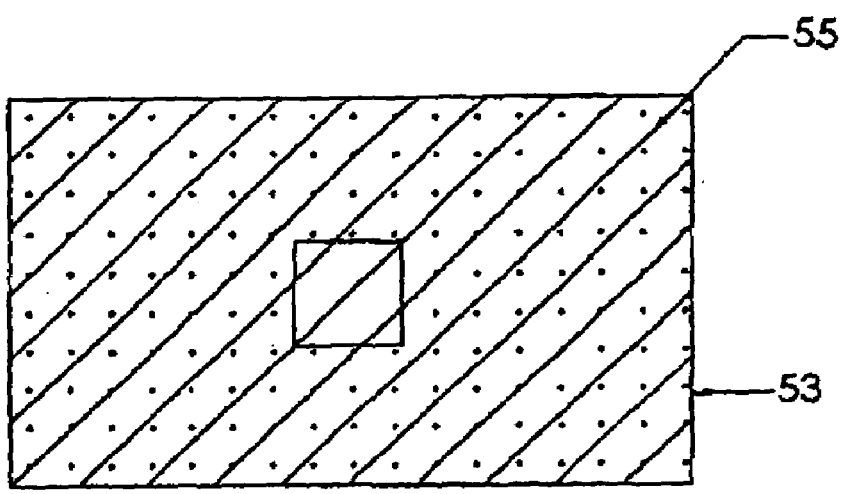
Figure 5C:
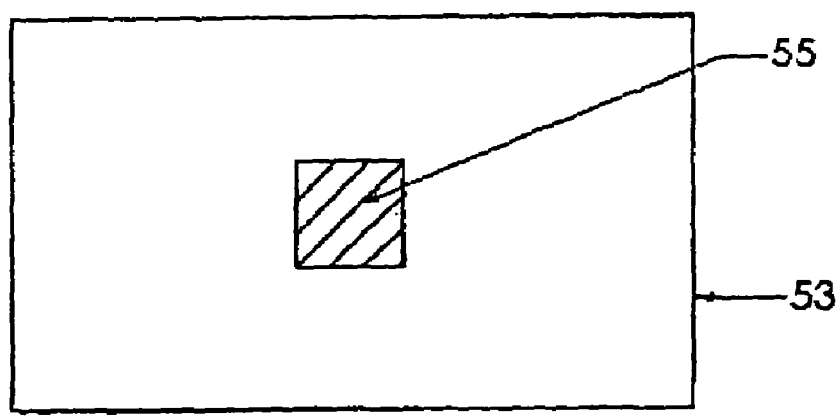

The formation of the printed conductive layer of a desired pattern may also be carried out by a "negative image printing" process as illustrated in FIGS. 5a-5c. In this process, a masking coating or ink (54) is first printed on a substrate layer (53) to create a "negative image" of the desired pattern. In other words, the masking coating or ink is printed in an area where the conductive material will not be present. In essence, the ink pattern serves as a mask for the subsequent deposition of the conductive material.

Any suitable printing techniques, such as flexographic, driographic, electrophotographic or lithographic printing, may be used to print the negative image on the substrate layer. In certain applications, other printing techniques, such as stamping, screen printing, gravure printing, ink jet printing or thermal printing may be suitable, depending on the resolution required.

In one embodiment, the masking coating or ink comprises a re-dispersible particulate. In another embodiment, the masking coating or ink comprises a water-soluble or water-dispersible polymer as a binder. Typical examples of water soluble polymers may include, but are not limited to, polyvinyl alcohol, polyvinylpyrrolidone, polyvinylpyridine, polyacrylic acid, polymethacrylic acid, polyacrylamide, polyethyleneglycol, poly(ethylene-co-maleic anhydride), poly(vinylether-co-maleic anhydride), poly(styrene-co-maleic anhydride), poly(butyelene-co-itaconic acid), PEOX [poly(ethyloxazoline)], polystyrene sulfonate, cellulose derivatives such as hydroxyethyl cellulose, hydroxypropyl cellulose, methyl cellulose, carboxymethyl cellulose, xanthan gum, gum Arabic, gelatin, lecithin or copolymers thereof. The water-dispersible polymer may comprise a water- or alkaline-dispersible wax, polyolefin, or acrylic latexes or dispersions. In one embodiment, the masking coating or ink comprises a solvent-soluble or solvent-dispersible polymer as a binder. In another embodiment, the masking coating or ink comprises a re-dispersible particulate derived from silica, $CaCO_3$, $CaSO_4$, $BaSO_4$, $Al_2O_3$, $TiO_2$, hollow-spheres, non-film-forming latexes or dispersions, inorganic pigment(s) or organic pigment(s). In one embodiment, the masking coating or ink comprises a re-dispersible particulate comprising polymeric or polymeric composite particles. In another embodiment, a re-dispersible particulate is included in the masking coating or ink to facilitate subsequent stripping of the masking coating or ink by reducing the thickness or integrity of the masking coating or ink layer and/or improving the permeation of a stripping solvent into the masking coating or ink layer during stripping.

After formation of the "negative image", a conductive material (55) is deposited on the patterned surface of the substrate layer as shown in FIG. 5b. In one embodiment, vapor deposition is used to deposit the conductive material on the patterned side of the substrate layer. In such an embodiment, aluminum, copper or any conductive material suitable for being deposited as a thin film through vapor deposition or spraying may be used as the conductive material. In one alternative embodiment, the conductive material is deposited by sputter coating the patterned side of the substrate layer with the conductive material. In such an embodiment, any conductive material such as gold, silver, copper, iron, nickel, zinc, indium, chromium, aluminum-doped zinc oxide, galinium indium oxide, tin oxide, or fluorine-doped indium oxide, or any other conductive material suitable for being deposited in a thin film through sputter coating may be used.

The masking coating or ink is finally stripped from the patterned surface of the substrate layer on which the conductive material has been deposited, as shown in FIG. 5c. The stripping of the coating/ink has the effect of stripping away the printed negative image formed as well as the portion of the conductive material that is deposited onto the area of the substrate layer where the coating/ink was present. As a result, the stripping solvent is able to strip away the coating/ink pattern and the conductive material formed on the top surface of the coating/ink pattern, even though the stripping step is performed after the deposition of the conductive material.

Suitable stripping solvents may include, but are not limited to, water, aqueous solutions, alcohols, ketones, esters, amides, hydrocarbons, alkylbenzenes, pyrrolidones, sulfones, DMSO, or many other common organic solvents or solvent mixtures.

In another alternative embodiment, the printing of the conductive material may be carried out by direct printing such as inkjet or screen printing of a conductive material to create a desired pattern.

In a further alternative embodiment, the desired pattern may be formed by laser ablation. In this case, a conductive material is printed or coated on the entire surface of a substrate layer and then selectively removed by laser ablation to create the desired pattern.

EXAMPLES

Preparation 1

Preparation of Array of Display Cells

A. Primer Coated Transparent Conductor Film

A primer coating solution containing 1.42 gm of Irostic® P9815 (polyurethane, Huntsman, Germany), 2.21 gm of CN983 (urethane diacrylate, Sartomer, Exton, Pa.), 1.10 gm of EB1290 (hexafunctional aliphatic urethane acrylate, UCB, Smyrna, Ga.), 0.13 gm of Irgacure™ 369 (2-benzyl-2-(dimethylamino)-1-[4-(4-morpholinyl)phenyl]-1-butanone, Ciba, Tarrytown, N.Y.), 0.13 gm of Sarcure SR1124 (isopropyl thioxanthone, Sartomer, Exton, Pa.), 0.03 gm of Irganox™ 1035 (thiodiethylene bis(3,5-di(tert)-butyl-4-hydroxyhydrocinnamate, Ciba Tarrytown, N.Y.), 80 gm of MEK (methyl ethyl ketone) and 15 gm of CHO (cyclohexanone) was mixed thoroughly and coated onto a 5 mil transparent conductor film (ITO/PET film, 5 mil OC50 from CPFilms, Martinsville, Va.) using a T#4 drawdown bar. The coated ITO film was dried in an oven at 65° C. for 10 minutes, and then exposed to 1.4 $J/cm^2$ of UV light under air using a UV conveyer (DDU, Los Angles, Calif.).

B. Preparation of Microcups

| Microcup Composition | | |
|---|---|---|
| Component | Weight Part | Source |
| EB 600 | 35.927 | UCB |
| SR 399 | 34.941 | Sartomer |
| HDDA | 22.337 | UCB |
| EB1360 | 6.503 | UCB |
| Irgacure 369 | 0.217 | Ciba |
| Sarcure SR1124 | 0.043 | Sartomer |
| Antioxidant Ir1035 | 0.033 | Ciba |

35.927 Gm of EB 600™ (acrylated epoxy oligomer, UCB, Smyrna, Ga.), 34.941 gm of SR 399™ (pentafunctional monomer, Sartomer, Exton, Pa.), 6.503 gm of EB1360™ (silicone acrylate, UCB, Smyrna, Ga.), 0.217 gm of Irgacure™ 369 (Ciba, Tarrytown, N.Y.), 0.043 gm of Sarcure SR1124 (ITX, Isopropyl-9H-thioxanthen-9-one, Sartomer, Exton, Pa.), 0.033 gm of Irganox™ 1035 (Ciba, Tarrytown, N.Y.) and 22.337 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 8"×8" electroformed Ni male mold for an array of 90 μm (length)×90 μm (width)×27 μm (depth)×11 μm (width of top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 1A, with the primer layer facing the Ni mold using a Hot Roll Laminator (ChemInstrument, Fairfield, Ohio) preset at a roller temperature of 200° F., lamination speed of 1 cm/sec and the roll pressure is 80 psi. A UV curing station with a UV intensity of 1.2 mw/cm$^2$ was used to cure the panel for 5.5 seconds. The ITO/PET film was then peeled away from the Ni mold at a peeling angle of about 30 degree to give a 8"×8" microcup array on ITO/PET. An acceptable release of the microcup array from the mold was observed. The thus obtained microcup array was further post-cured with a UV conveyor curing system (DDU, Los Angles, Calif.) with a UV dosage of 2.8 J/cm$^2$.

C. Filling and Sealing of the Microcups

An electrophoretic dispersion was filled into the microcups prepared from Preparation 1B using a #0 drawdown bar. The filled microcups were then over coated with a top-sealing/adhesive solution consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl]2-morpholinopropan-1-one), 40.8 parts by weight of MEK, 40.8 parts by weight of IPAc and 4.3 parts by weight of CHO (cyclohexanone) with a doctor blade. The sealing layer was air-dried for 10 minutes and heated in an 80° C. oven for 2 minutes to form a seamless sealing on the filled microcup. The targeted (dry) thickness of the sealing layer was about 3~4 microns.

Example 1

Figure 6:
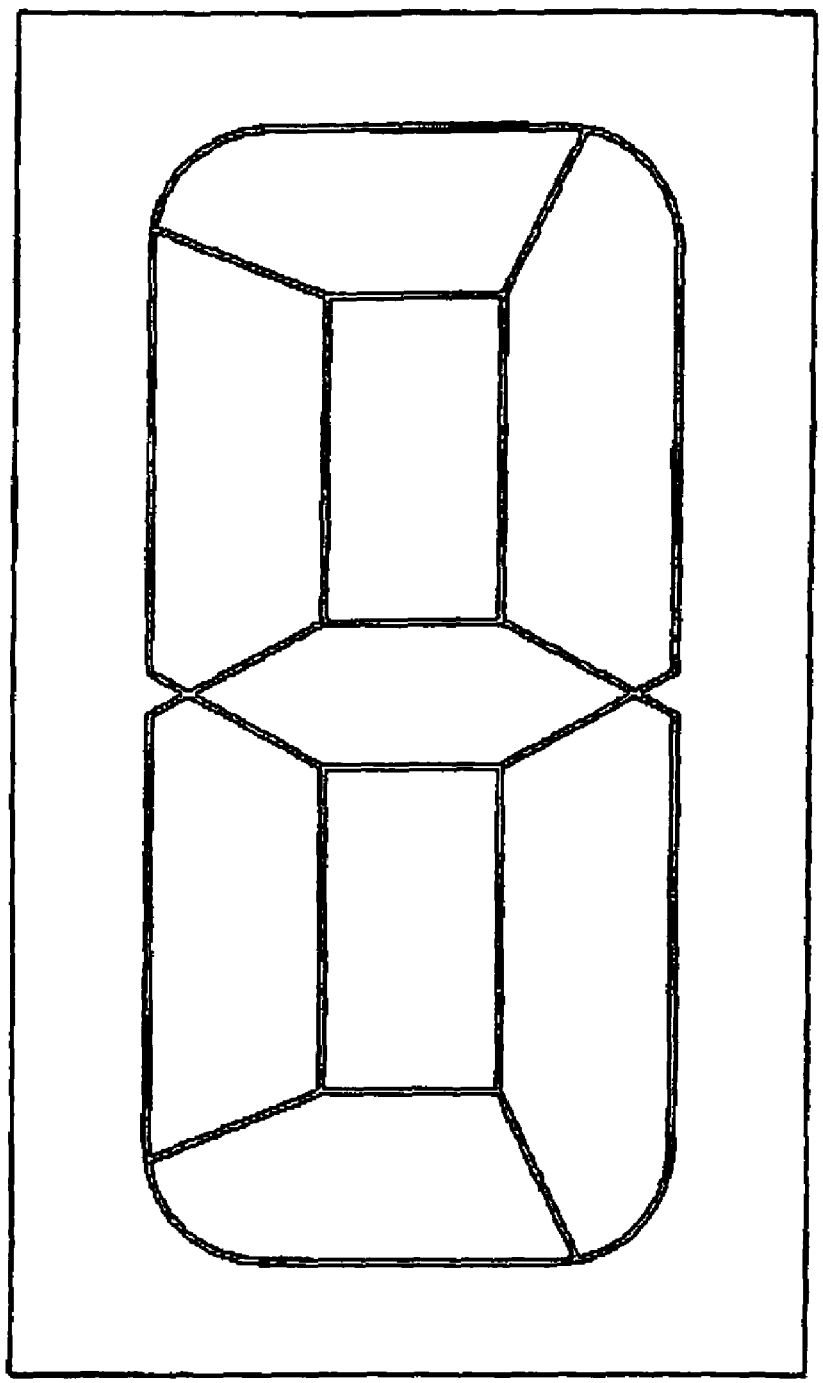
FIG. 6 shows a 7-segment design pattern.

A 3M 1125 tape having a copper foil with an acrylic pressure sensitive adhesive on the backside and a liner, was used as the backplane. A 7-segment pattern (FIG. 6) was formed on the copper foil with a Gerber HS 15 cutting plotter. On the liner side, through holes were formed also with a Gerber HS 15 cutting plotter. The backplane was then laminated, under 80 psi and 80° C. at 3 feet per minute, over the display cells prepared from Preparation 1.

The resulting panel then underwent the switching test. The 7 segments and the "islands" enclosed by the seven segments were switched independently. The driving voltage for the test was the same as that needed to drive electrophoretic displays with a patterned ITO backplane.

Example 2

A silver conductive paste, DD paste NE 140 made by Tatsuta System Electronics Co., LTD, was screen printed on a UV10 release film, supplied by CPFilms Inc., to create a 7-segment conductive layer. After printing, the conductive-paste-printed UV10 release film was dried in a 120° C. oven for 10 minutes and then laminated with adhesive-layer-coated display cells prepared from Preparation 1. Because of the release characteristics of the UV10 film, the printed conductive layer was transferred to the adhesive layer when UV10 film was peeled off. Finally, a 4 mil DuPont Melinex film with pre-formed through holes was aligned and laminated over the conductive layer.

The resulting panel then underwent the switching test. The 7 segments and the "islands" enclosed by the seven segments were switched independently. The driving voltage for the test was the same as that needed to drive electrophoretic displays with a patterned ITO backplane.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display panel which comprises:
   i) a layer of display cells;
   ii) a common electrode layer;
   iii) a backplane which comprises a patterned conductive layer and a non-conductive layer with through holes and said non-conductive layer is formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials; and
   iv) an adhesive layer,
   wherein said layer of display cells is between said common electrode layer and said backplane and said adhesive layer is between the patterned conductive layer and the non-conductive layer.

2. The display panel of claim 1 further comprising conducting lines connecting the patterned conductive layer to driving components through the through holes.

3. The display panel of claim 1 wherein said patterned conductive layer is formed of a metal, metal oxide, alloy or a multilayer composite.

4. The display panel of claim 1 wherein the display cell layer is prepared by the microcapsule technology.

5. The display panel of claim 1 wherein the display cell layer is prepared by the microcup technology.

6. The display panel of claim 1 wherein the display cell layer comprises the partition-type display cells.

7. The display panel of claim 1 wherein the display cell layer comprises display cells filled with a liquid crystal composition.

8. The display panel of claim 1 wherein the display cell layer is prepared by the Gyricon technology.

9. The display panel of claim 1 wherein the display cell layer comprises display cells filled with an electrophoretic fluid.

10. A process for the manufacture of a display panel, which process comprises the following steps:
    i) forming a patterned conductive layer by printing a pattern with a conductive material on an adhesive layer on a display cell layer;
    ii) forming through holes on a non-conductive layer or forming a non-conductive layer with through holes and said non-conductive layer is formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials;
    iii) assembling together said display cell layer, the patterned conductive layer, the non-conductive layer with through holes; and
    iv) connecting the patterned conductive layer to driving components through the through holes.

11. A process for the manufacture of a display panel, which process comprises the following steps:
    i) forming a patterned conductive layer by printing a pattern with a conductive material on a temporary substrate that possesses release characteristics and transferring the pattern onto an adhesive layer on a display cell layer;
    ii) forming through holes on a non-conductive layer or forming a non-conductive layer with through holes and said non-conductive layer is formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials;
    iii) assembling together said display cell layer, the patterned conductive layer, the non-conductive layer with through holes; and
    iv) connecting the patterned conductive layer to driving components through the through holes.

12. A process for the manufacture of a display panel, which process comprises the following steps:
    i) forming a patterned conductive layer by a positive image printing method which comprises printing a patterned area with an ink or printable material, covering a non-conductive base layer, an adhesive layer, a temporary substrate or a non-conductive layer, with a conductive material and removing the conductive material which is not in the patterned area;
    ii) forming through holes on said non-conductive layer or forming a non-conductive layer with through holes, said non-conductive layer being formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials;
    iii) assembling together a display cell layer, the patterned conductive layer, the non-conductive layer with through holes; and
    iv) connecting the patterned conductive layer to driving components through the through holes.

13. A process for the manufacture of a display panel, which process comprises the following steps:
    i) forming a patterned conductive layer by a negative image printing method which comprises printing an area which is not in the patterned area with an ink or printable material, covering a non-conductive base layer, an adhesive layer, a temporary substrate or a non-conductive layer, with a conductive material and removing the ink or printable material and the conductive material which are not in the patterned area;
    ii) forming through holes on said non-conductive layer or forming a non-conductive layer with through holes and said non-conductive layer is formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials;
    iii) assembling together a display cell layer, the patterned conductive layer, the non-conductive layer with through holes; and
    iv) connecting the patterned conductive layer to driving components through the through holes.

14. A process for the manufacture of a display panel, which process comprises the following steps:
    i) forming a patterned conductive layer by selectively laser abating a conductive layer on a non-conductive base layer of a display cell layer, an adhesive layer on the display cell layer, a temporary substrate that possesses release characteristics or on a non-conductive layer;
    ii) forming through holes on said non-conductive layer or forming a non-conductive layer with through holes and said non-conductive layer is formed from a material selected from the group consisting of acetates, acrylics, acetal resins, polycarbonates, melamines, neoprene rubbers, polyesters, polyolefins, polystyrenes, polyurethanes, polyvinylchlorides, thermoplastic materials and plastic materials;
    iii) assembling together said display cell layer, the patterned conductive layer, the non-conductive layer with through holes; and
    iv) connecting the patterned conductive layer to driving components through the through holes.

15. The process of claim 10, 11, 12, 13 or 14 wherein the through holes on the non-conductive layer are formed by cutting, punching or drilling.

16. A display panel which comprises:
    i) a layer of display cells;
    ii) a common electrode layer; and
    iii) a backplane which comprises a patterned conductive layer and a non-conductive layer with through holes and said non-conductive layer is formed from a material selected from the group consisting of polysulfone, polyetherimide, polyamideimide, polyphenylene, acrylonitrile, butadiene and styrene;

wherein said layer of display cells is sandwiched between said common electrode layer and said backplane.

17. A process for the manufacture of a display panel, which process comprises the following steps:
  i) forming a patterned conductive layer;
  ii) forming through holes on a non-conductive layer or forming a non-conductive layer with through holes and said non-conductive layer is formed from a material selected from the group consisting of polysulfone, polyetherimide, polyamideimide, polyphenylene, acrylonitrile, butadiene and styrene;
  iii) assembling together a layer of display cells, the patterned conductive layer, the non-conductive layer with through holes; and
  iv) connecting the patterned conductive layer to driving components through the through holes.

* * * * *